(12) United States Patent
Dutta et al.

(10) Patent No.: US 11,607,748 B2
(45) Date of Patent: Mar. 21, 2023

(54) APPARATUS FOR MULTI-NOZZLE METAL ADDITIVE MANUFACTURING

(71) Applicant: DM3D TECHNOLOGY, LLC, Auburn Hills, MI (US)

(72) Inventors: Bhaskar Dutta, Troy, MI (US); Vijayavel Bagavath-Singh, Troy, MI (US); Mark David Lewan, White Lake, MI (US)

(73) Assignee: DM3D Technology, LLC, Auburn Hills, MI (US)

( * ) Notice: Subject to any disclaimer, the term of this patent is extended or adjusted under 35 U.S.C. 154(b) by 378 days.

(21) Appl. No.: 16/645,837

(22) PCT Filed: Sep. 10, 2018

(86) PCT No.: PCT/US2018/050228
§ 371 (c)(1),
(2) Date: Mar. 10, 2020

(87) PCT Pub. No.: WO2019/055343
PCT Pub. Date: Mar. 21, 2019

(65) Prior Publication Data
US 2020/0198059 A1     Jun. 25, 2020

Related U.S. Application Data

(60) Provisional application No. 62/558,581, filed on Sep. 14, 2017.

(51) Int. Cl.
*B05B 9/01*      (2006.01)
*B23K 26/342*    (2014.01)
(Continued)

(52) U.S. Cl.
CPC ........ *B23K 26/342* (2015.10); *B23K 26/0604* (2013.01); *B23K 26/0823* (2013.01);
(Continued)

(58) Field of Classification Search
USPC ........................................................ 219/76.1
See application file for complete search history.

(56) References Cited

U.S. PATENT DOCUMENTS

2010/0021580 A1   1/2010   Swanson
2016/0136900 A1*   5/2016   Goodman ............. B29C 64/106
                                                                    264/40.1

FOREIGN PATENT DOCUMENTS

WO       2015035894 A1     3/2015

OTHER PUBLICATIONS

International Search Report and Written Opinion in International Application No. PCT/US2018/050228 dated Dec. 21, 2018.

\* cited by examiner

*Primary Examiner* — Quana Grainger
(74) *Attorney, Agent, or Firm* — Warner Norcross + Judd LLP

(57) ABSTRACT

An assembly for rapid manufacturing of symmetrical objects by direct metal deposition is disclosed. A rotary stage provides rotational movement to an object supported by the stage around a central stage axis. Nozzles are spaced above the rotary stage for performing direct metal deposition for building an object supported by the stage. Each nozzle is independently moveable along a horizontal axis and independently pivotable, and combined, moveable along a vertical axis for providing symmetrical movement corresponding to a symmetrical deposition configuration of the object while the object is rotated around the central stage axis.

16 Claims, 7 Drawing Sheets

(51) Int. Cl.
  *B33Y 30/00* (2015.01)
  *B23K 26/06* (2014.01)
  *B23K 26/08* (2014.01)
  *B23K 26/14* (2014.01)
(52) U.S. Cl.
  CPC ...... *B23K 26/0884* (2013.01); *B23K 26/1464* (2013.01); *B33Y 30/00* (2014.12)

APPARATUS FOR MULTI-NOZZLE METAL ADDITIVE MANUFACTURING

CROSS-REFERENCE TO RELATED APPLICATION

This application claims the benefit of U.S. Provisional Application No. 62/558,581, filed Sep. 14, 2017, the disclosure of which is hereby incorporated by reference in its entirety.

TECHNICAL FIELD

The present application relates toward improved Direct Metal Deposition (DMD) processing of symmetrical objects. More specifically, the present application relates toward DMD processing using a multi-nozzle system in the field of additive manufacturing.

BACKGROUND

Various processes have been used to deposit material onto a workpiece to enhance dimensional and durability characteristics of the 3D workpiece. One such process is known as Direct Metal Deposition (DMD) where a laser energy beam focused upon the workpiece is infused with powder metal alloy causing the alloy to become molten and deposit upon the 3D workpiece. While this process has been proven technically feasible and commercially viable, its use is sometimes limited when manufacturing large objects due the requirement of fast processing rates without sacrificing process quality of the build.

Minimizing deposition time in additive manufacturing using multiple nozzle configuration has been attempted. U.S. Pat. No. 9,623,607 titled "Additive Manufacturing Device" discloses the use of multiple writing heads or nozzles to simultaneously deposit different segments of the 3D object. This system discloses a stationary stage onto which an object is printed. Multiple writing heads independently driven by linear actuators attend to at least one segment group of the same 3D object. To avoid possible collision, minimal distance limit is maintained between nozzles. After the current layer's segment group is processed, the writing heads travel back to the same or new start point in a segment group for the next layer. This return travel is to avoid collision between nozzles and/or to maintain the same direction of build path, which are non-productive travel movements inherent to such configuration.

However, when manufacturing symmetrical workpieces with at least two axes of symmetry for example to build a three dimensional object in the shape of a triangular hollow prism or hollow cylinder, the system disclosed in the U.S. Pat. No. 9,623,607 patent has shortcoming due to the segment wise sharing of nozzles to a stationary workpiece. The shortcoming includes increased deposition time due to the process wait times on non-productive return travel movement of nozzle heads.

U.S. Pat. No. 10,052,824 titled "Systems, Devices, and Methods for Three-Dimensional Printing" discloses the use of series of parallel extruders or nozzles to simultaneously deposit different segments of the 3D object. This system discloses a stationary stage onto which the workpiece an object is printed. Series of parallel nozzles combinedly driven by linear actuators attend to different segment group of the same 3D object simultaneously. Selective nozzles are switched on/off depending on the build profile during the same deposition layer.

However, when manufacturing symmetrical workpieces with at least two axes of symmetry for example to build a three dimensional object in the shape of a triangular hollow prism or hollow cylinder, the system disclosed in the U.S. Pat. No. 10,052,824 patent has shortcoming due to series of parallel nozzles attending to a stationary workpiece. The shortcoming includes increased deposition time due to non-productive travel movements to overcome gaps between adjacent nozzles and inefficiently sharing of nozzles to workpiece making selective nozzles idle during the same deposition layer.

A considerable number of metal 3D printing parts have at least two rotational axes of symmetry. In such cases, the system disclosed in the U.S. Pat. No. 9,623,607 and 10,052,824 patents does not provide adequate efficiency. Therefore, there is a need to develop an apparatus to process workpieces with at least two rotational axes of symmetry at an increased speed.

SUMMARY

An assembly for rapid manufacturing of symmetrical objects by direct metal deposition is disclosed. A rotary stage provides pivotal movement to an object supported by the stage around a vertical stage axis. A plurality of nozzles is spaced above the rotary stage for performing direct metal deposition for building an object supported by the stage. Each of the plurality of nozzles is independently moveable along a linear axis and independently pivotable about a rotary axis for providing symmetrical movement corresponding to a symmetrical deposition configuration of the object while the object is rotated around the stage axis. A system of nozzles is movable along a vertical z-axis to build the object in a layer-by-layer fashion as required in additive manufacturing. It should be understood by those of skill in the art that the direct material deposition involves deposition of metal alloys, ceramics, or any combination of the materials.

In one embodiment, the assembly includes first and second direct metal deposition nozzles, each having a laser beam and a source of metallic alloy powder. The nozzles are supported along a horizontal slide and are pivotable about first and second horizontal pivot axes. The assembly further includes a rotary stage that provides rotational movement about a vertical stage axis. The nozzles are positioned above the rotary stage and are operable to simultaneously form at least a portion of a workpiece on the rotary stage, the workpiece having rotational symmetry about a vertical axis, such that metal deposition occurs while the workpiece undergoes rotation. The assembly of the present invention provides significant reduction in deposition time to produce or repair an object or workpiece. Utilization of nozzle pairs reduces deposition time by factors of two, four, six, etc. depending upon the number of nozzle pairs selected. In addition, the assembly of the present invention takes advantage of symmetrical configuration of objects and workpieces by way of the symmetrical alignment and movement of the nozzles.

These and other features and advantages of the present invention will become apparent from the following description of the invention, when viewed in accordance with the accompanying drawings and the appended claims.

DETAILED DESCRIPTION

Figure 1:
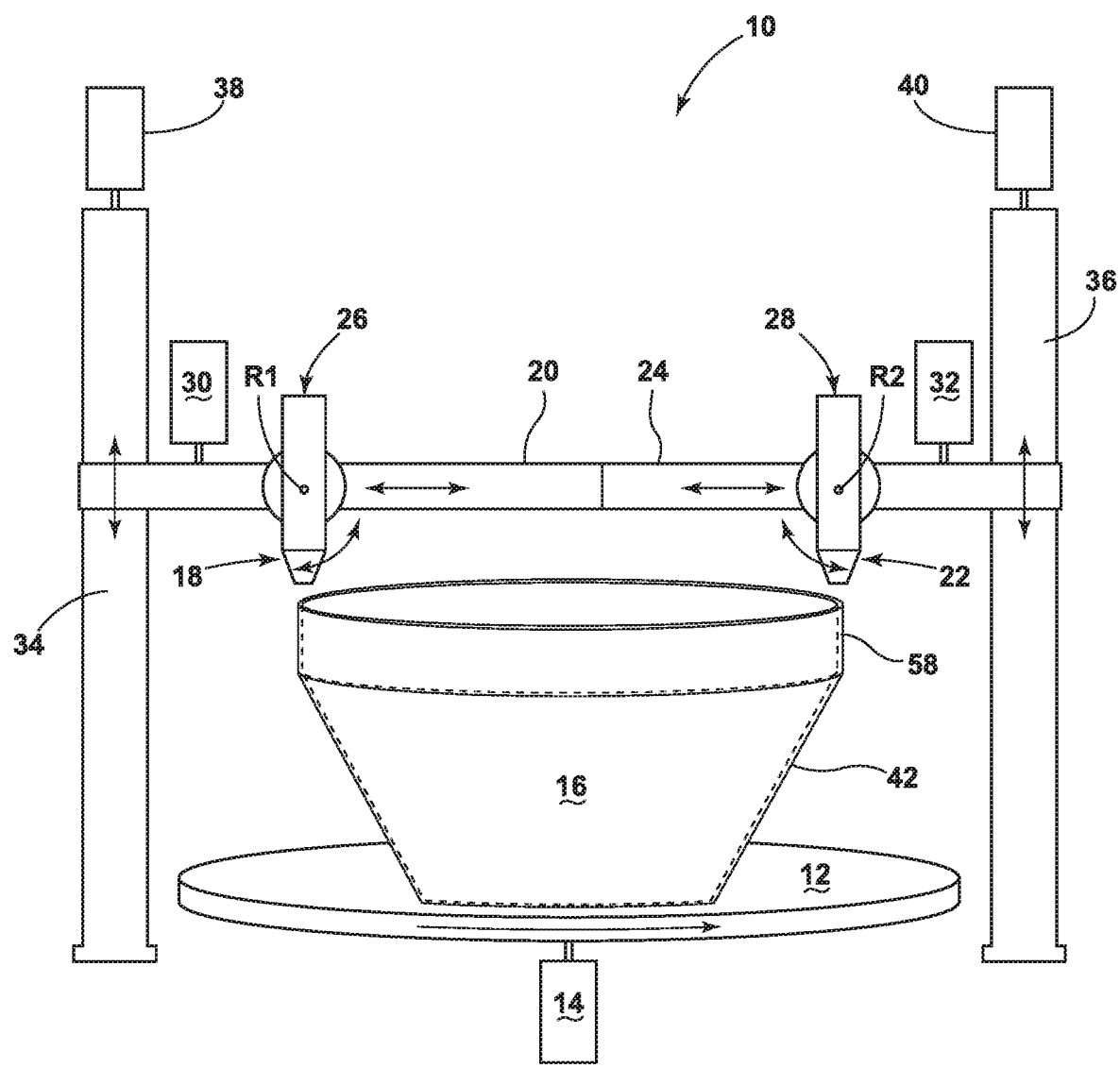
FIG. 1 shows a basic configuration of a system for processing a symmetric workpiece with at least two axes of symmetry.

Direct Metal Deposition (DMD) is a metal additive manufacturing process. Referring to FIG. 1, a Direct Metal Deposition (DMD) assembly of the present invention is generally shown at 10. DMD also includes the additive manufacturing of a hybrid and non-metallic materials, for example, combination ceramic and metallic alloys and pure ceramics. A rotary stage 12 receives rotational movement from a rotary servo motor 14. The stage 12 rotates about a central axis "a" (shown in FIG. 2) to rotate a workpiece 16 onto which DMD is performed. In one embodiment, the workpiece 16 is completely formed by DMD. In another embodiment the workpiece 16 is partially formed from an alternative manufacturing process, such as stamping or forging, and DMD is used to complete the workpiece 16. In still a further embodiment, DMD is performed on an existing workpiece 16 as part of a rebuild or repair process.

A first nozzle 18 is mounted on a first horizontal slide 20 and a second nozzle 22 is mounted on a second horizontal slide 24. Each nozzle 18, 22 is configured for performing direct metal deposition such disclosed in U.S. Pat. No. 6,534,745, the contents of which are included herein by reference. The first nozzle 18 is pivotable on a first rotary axis R1 and the second nozzle is pivotable on a second rotary axis R2, the first rotary axis R1 and the second rotary axis R2 being horizontal and parallel to each other. A first rotary motor 26 pivots the first nozzle 18 around the first rotary axis R1 and a second rotary motor 28 pivots the second nozzle 22 around the second rotary axis R2. The first rotary motor 26 and the second rotary motor 28 are contemplated to be servo motors that operate in a synchronous manner as will be explained further herein below.

The horizontal slides 20, 24 provide linear motion to each nozzle so as to adjust their locations as demanded by varying object dimensions at different vertical heights. A first motor 30 moves the first nozzle 18 in a horizontal direction along first horizontal slide 20 and a second motor 32 moves the second nozzle 22 in the horizontal direction along the second horizontal slide 24. The first and second motors 30, 32 simultaneously move the nozzles 18, 22 radially inwardly and outwardly relative to the center of the object for symmetrical deposition of material while forming the workpiece 16. The first horizontal slide 20 is mounted on a first tower 34 and the second horizontal slide 24 is mounted on a second tower 36. A first vertical motor 38 moves the first slide 20 in a vertical direction along the first tower 34 and a second vertical motor 40 moves the second slide 24 in a vertical direction along the second tower 36. It should also be understood that movement along the vertical axis (towers 34 and 36) can be achieved by a robotic arm (not shown) or by a gantry system (not shown) and that the rotary axis R1, R2 can be combined or mounted on a tilt axis.

As set forth above, the nozzles 18, 22 perform DMD in a symmetrical manner Therefore, the nozzles 18, 22 are moved by the various motors in a symmetrical manner. If the workpiece 16 increases in diameter with each successive DMD layer, the nozzles are each moved radially outward from the central axis "a." Further, each nozzle 18, 22 is collectively moved in elevation with each successive layer of DMD. Still further, each nozzle 18, 22 is symmetrically pivoted at axes R1 and R2 respectively to deposit first angled walls 42 of the workpiece 16. The introduction of two symmetrical nozzles 18, 22 reduces manufacturing time of the workpiece 16 by a factor of two over the use of a single nozzle, thereby doubling manufacturing throughput.

Figure 2:
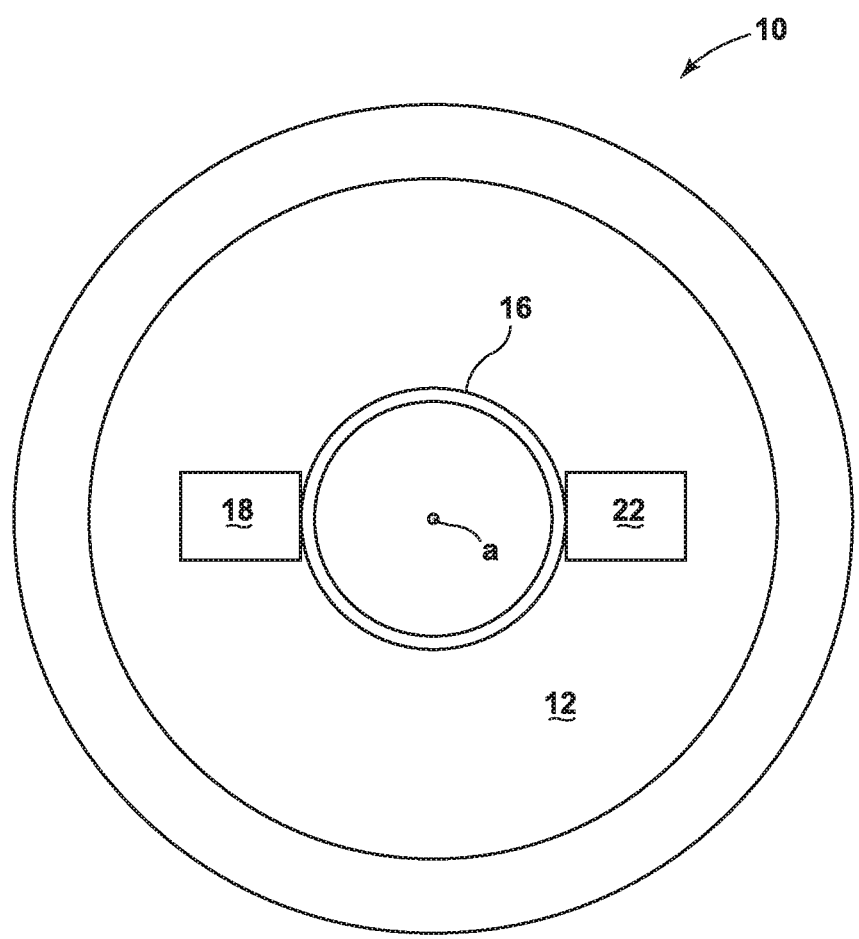
FIG. 2 shows the top view schematic of the system with one pair of nozzle.

FIG. 2 shows a top, schematic view of the two nozzles 18, 22. The nozzles are symmetrical with respect to the central axis "a" and the workpiece 16. Symmetric alignment allows for necessary cooling of a melt pool (not shown) formed with each successive layer. It should also be understood that because the rotary stage 12 can rotate continuously, the nozzles 18, 22 may also perform DMD continuously, eliminating the need to stop deposition for the purpose of recalculating the next deposition path.

Figure 3:
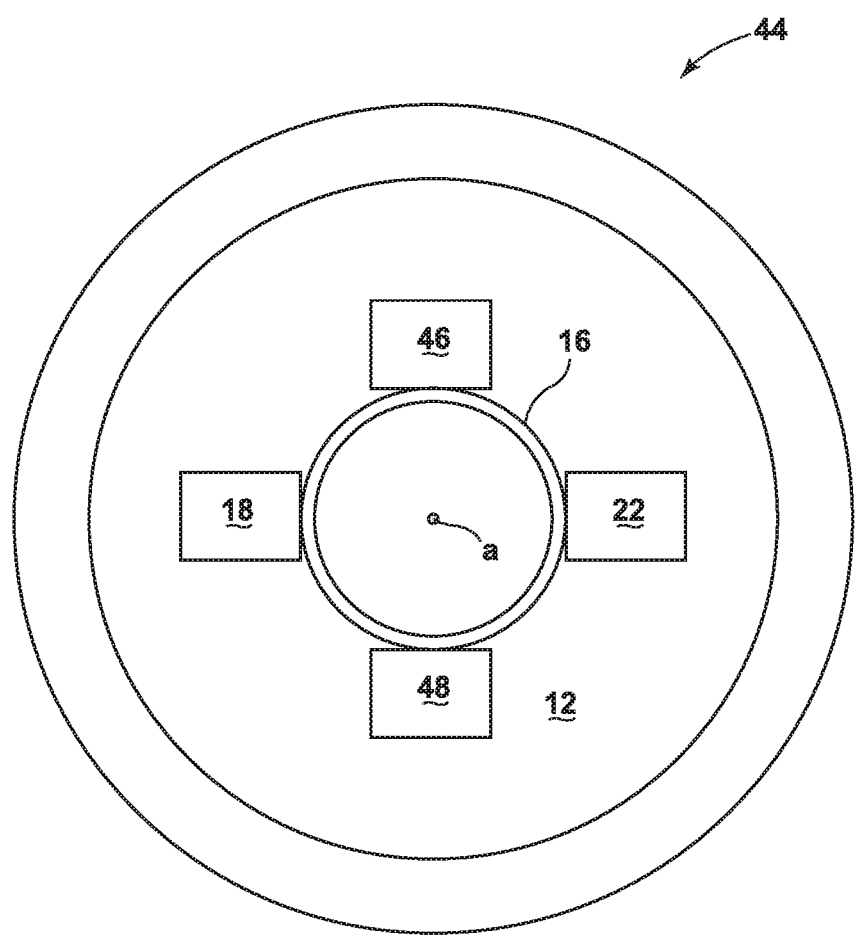
FIG. 3 shows the top view schematic of the system with two pair of nozzles.

FIG. 3 shows a top schematic view of an alternative embodiment generally at 44. In this embodiment, a third nozzle 46 and a forth nozzle 48 are included with the first nozzle 18 and the second nozzle 22. The nozzles 18, 22, 46, 48 are symmetrically spaced around the central axis "a" and perform DMD in a synchronized manner Although not shown, an additional tower, horizontal slide and pivoting rotary axis and necessary servo motors are included for each additional nozzle 46, 48. Therefore, the DMD processing time for the workpiece is now quartered or reduced by a factor of four.

Figure 4:
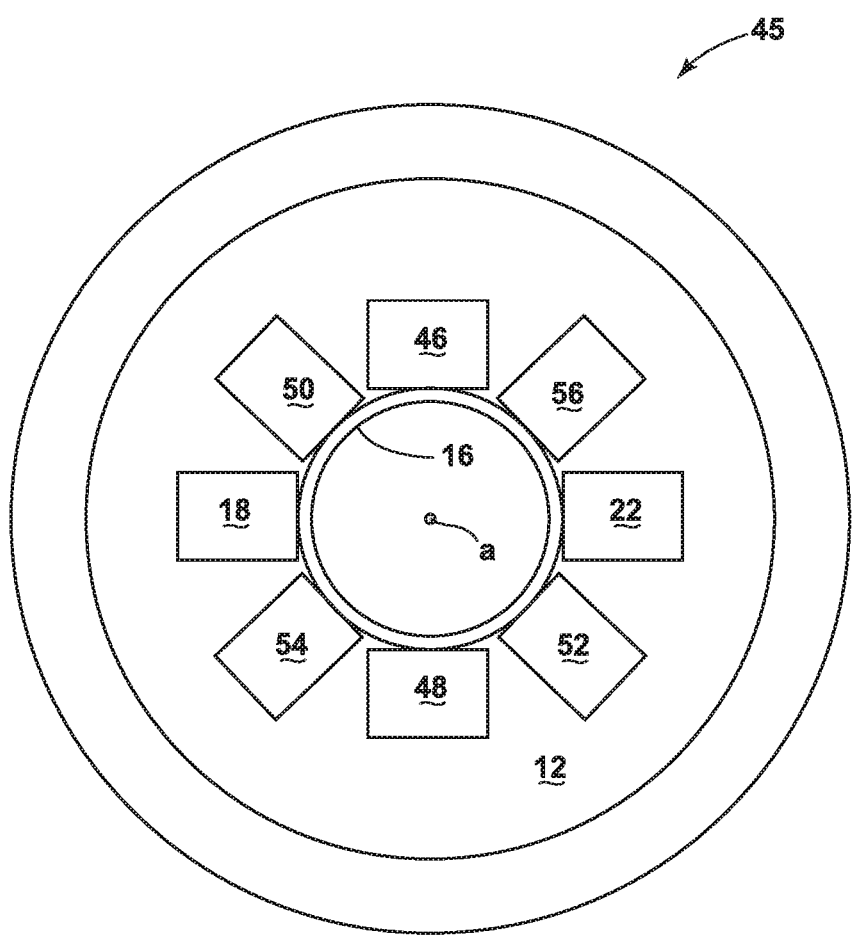
FIG. 4 shows the top view schematic of the system with four pairs of nozzles.

FIG. 4 shows a still further embodiment generally at 45 that includes a fifth nozzle 50, a sixth nozzle 52, a seventh nozzle 54 and an eight nozzle 56. Each nozzle 18, 22, 46, 48, 50, 52, 54, 56 are symmetrically aligned around the central axis "a" in a manner similar to that set forth in the prior embodiment. Therefore, the DMD processing time is reduced by a factor of eight. It should also be understood to those of ordinary skill in the art that an odd number of nozzles may also be used and that the invention of the present application is not limited to an even number of nozzles. The nozzle pairs are typically placed in a circular formation, since symmetrical objects are always optimally accommodated inside a circular space.

Figure 5A:
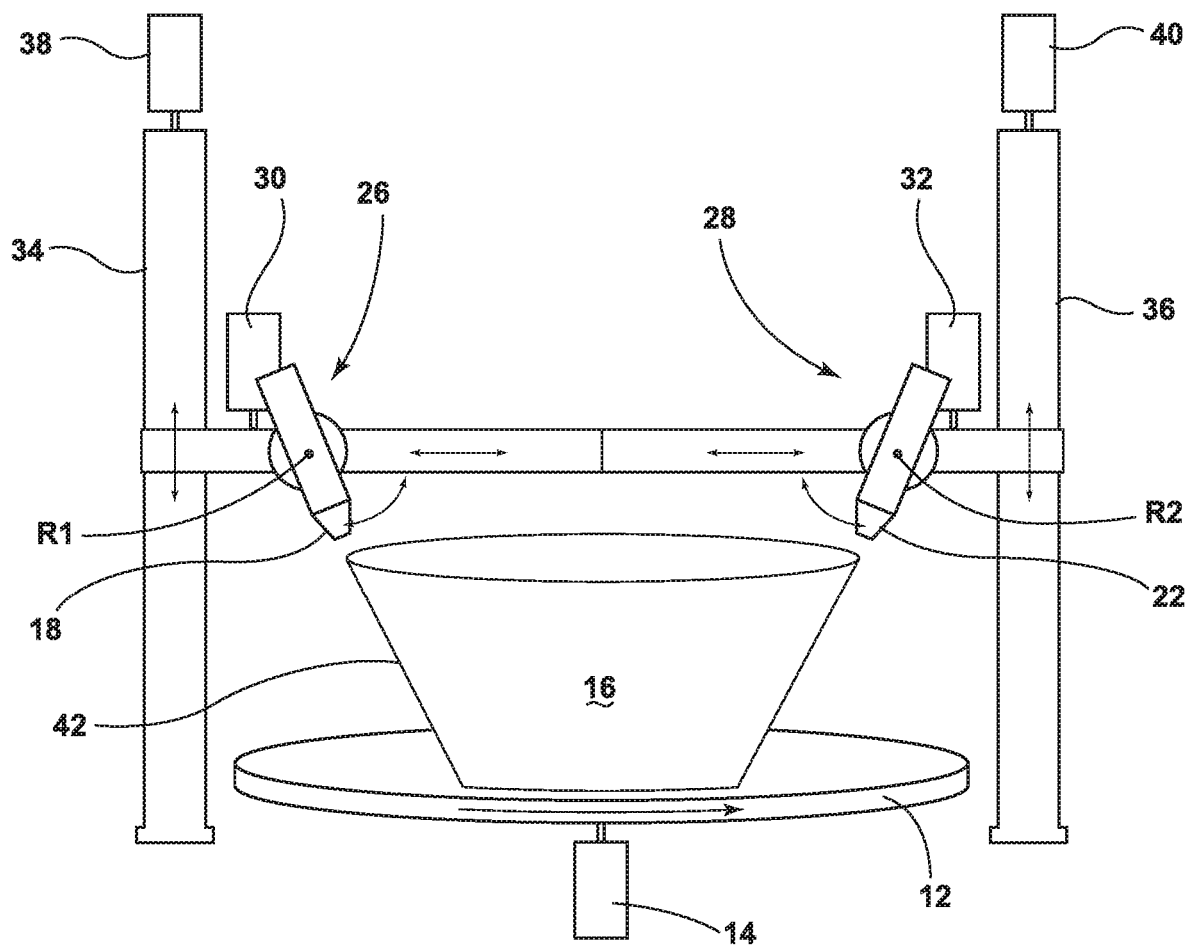
FIG. 5A shows DMD of a first portion of a workpiece using the apparatus of FIG. 1.
Figure 5B:
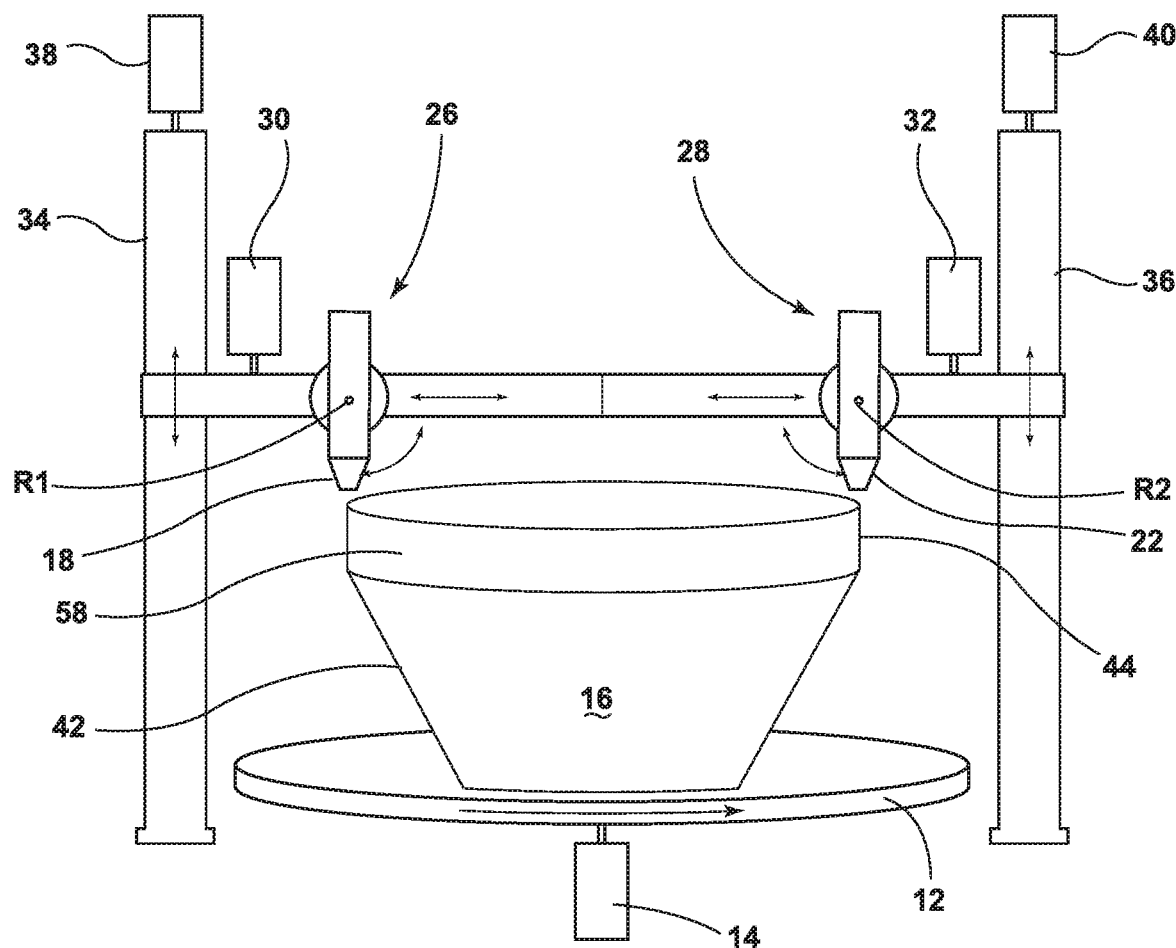
FIG. 5B shows DMD of a second portion of a workpiece using the apparatus of FIG. 1.
Figure 5C:
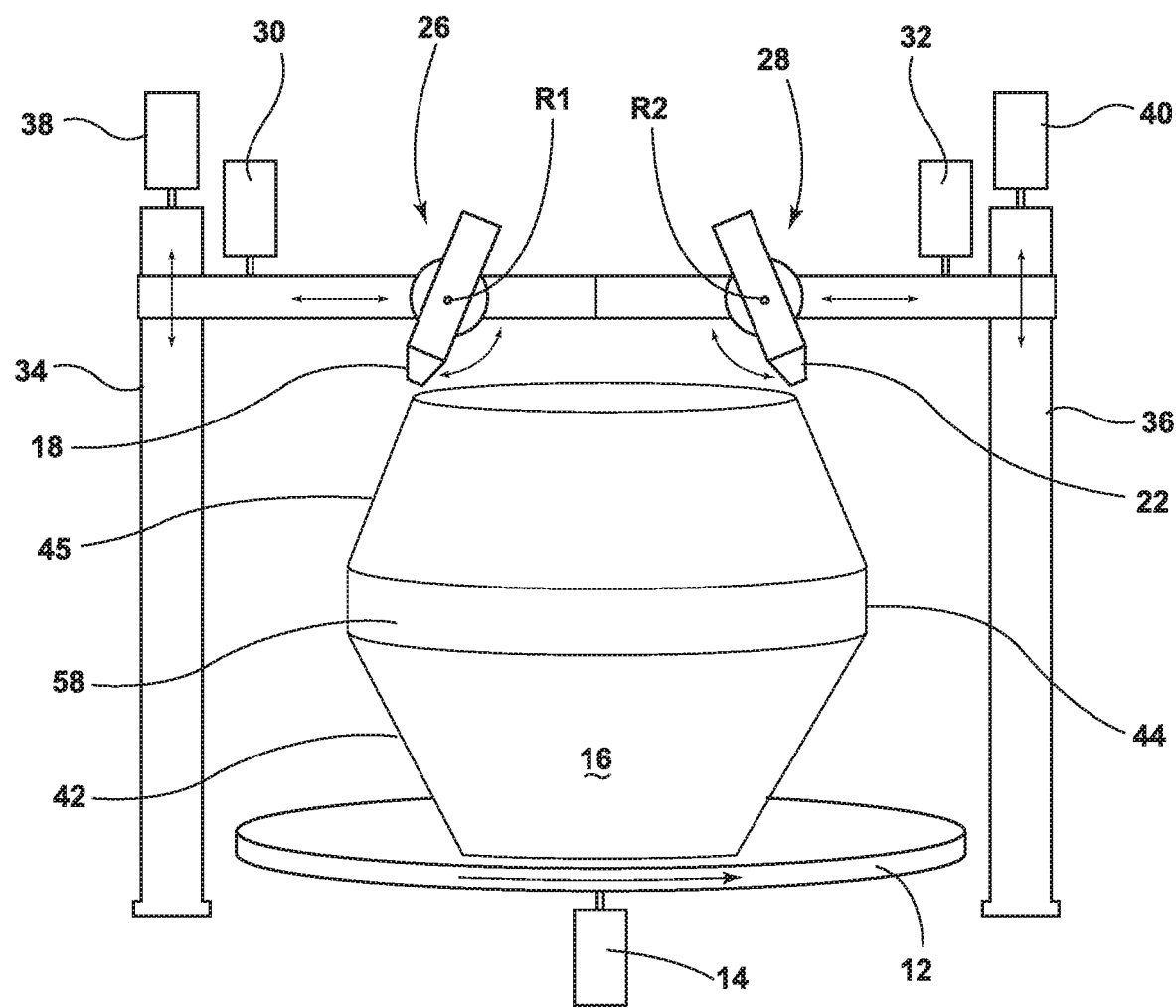
FIG. 5C shows DMD of a third portion of a workpiece using the apparatus of FIG. 1.

FIGS. 5A, 5B, and 5C show a workpiece 16 being formed, the workpiece 16 having a geometry not possible in conventional sheet metal forming due to a die lock configuration. FIG. 5A shows the first wall 42 being formed at an obtuse angle to the central axis "a," requiring the nozzles 18, 22 be pivoted inwardly toward the central axis "a." FIG. 5B shows a second wall 58 being formed that is parallel to the central axis "a," requiring the nozzles 18, 22 also be pivoted to be parallel to the central axis "a." FIG. 5C shows a third wall 45 being formed at an acute angle to the central axis "a," requiring the nozzles 18, 22 be pivoted to an obtuse angled to the central axis "a."

The invention has been described herein in an illustrative manner, and it is to be understood that the terminology which has been used is intended to be in the nature of words of description rather than of limitation. Obviously, many modifications and variations of the invention are possible in light of the above teachings. The invention can be practiced otherwise than as specifically described within the scope of the appended claims.

What is claimed is:

1. An assembly for rapid manufacturing of objects having rotational symmetry by direct metal deposition, the assembly comprising:

a rotary stage for providing rotational movement of an object supported by said stage about a central stage axis; and a plurality of nozzles spaced above said rotary stage for performing direct metal deposition upon the object supported by said stage, wherein said plurality of nozzles include a first nozzle mounted on a first horizontal slide and a second nozzle mounted on a second horizontal slide, wherein said first and second horizontal slides provide linear motion to said first and second nozzles, respectively, said first horizontal slide being mounted on a first tower and said second horizontal slide being mounted on a second tower;

a first vertical motor to move said first horizontal slide in a vertical direction along said first tower, and a second vertical motor to move said second horizontal slide in a vertical direction along said second tower; and wherein each of said plurality of nozzles are independently moveable along a common horizontal axis and are independently rotatable about first and second pivot axes, said plurality of nozzles being combinedly moveable along a vertical axis, said nozzles configured to be symmetrical with respect to said central stage axis, for providing symmetrical movement corresponding to a symmetrical deposition configuration of the object supported on said rotary stage while the object is rotated around said central stage axis.

2. The assembly set forth in claim 1, wherein said plurality of nozzles comprises a pair of linearly coupled independently driven nozzle heads to deposit material and build at least one point of the object in three dimensions.

3. The assembly set forth in claim 1, wherein said plurality of nozzles includes a plurality of nozzle pairs for simultaneously depositing single layers of material.

4. The assembly set forth in claim 1, wherein said plurality of nozzles perform direct metal deposition to workpieces including at least two symmetrical axes.

5. The assembly set forth in claim 1, wherein each of said plurality of nozzles is coupled for synchronous linear movement along the horizontal and vertical axes and pivotal movement on the horizontal axis.

6. The assembly set forth in claim 1, wherein each of said plurality of nozzles is linearly coupled and independently driven above the rotary stage for depositing material with two or more axes of symmetry.

7. The assembly set forth in claim 1, further including two separate drive mechanisms for each of said plurality of nozzles for providing horizontal and pivotal movement for each of said plurality of nozzles.

8. The assembly set forth in claim 7, wherein each of said drive mechanisms for each of said plurality of nozzles are synchronized by a motion controller for maintaining synchronous movement relative to said object revolving with said rotary stage for depositing three-dimensional geometry of said object.

9. The assembly set forth in claim 1, wherein said plurality of nozzles are configured for performing direct metal deposition thereby manufacturing or rebuilding the object by three-dimensional printing.

10. The assembly set forth in claim 1, wherein said plurality of nozzles includes a plurality of nozzle pairs for performing direct metal deposition.

11. An assembly for direct metal deposition comprising:

first and second direct metal deposition nozzles, each of the first and second direct metal deposition nozzles including a laser beam and a source of metallic alloy powder;

a first horizontal slide supporting said first direct metal deposition nozzle and a second horizontal slide supporting said second direct metal deposition nozzle, wherein said first and second direct metal deposition nozzles are pivotable relative to said first and second horizontal slides about respective first and second pivot axes that are parallel to each other, wherein the first and second direct metal deposition nozzles independently translate along said first and second horizontal slides, wherein said first and second horizontal slides provide linear motion to said first and second direct metal deposition nozzles, respectively, said first horizontal slide being mounted on a first tower and said second horizontal slide being mounted on a second tower;

a first vertical motor to move said first horizontal slide in a vertical direction along said first tower, and a second vertical motor to move said second horizontal slide in a vertical direction along said second tower; and a rotary stage for providing rotational movement of an object about a central stage axis, said rotary stage being positioned below said first and second horizontal slides, wherein said first and second direct metal deposition nozzles are configured to be symmetrical with respect to the central stage axis and are adapted to simultaneously form at least a portion of a workpiece on the rotary stage, the workpiece having rotational symmetry about central stage axis, such that metal deposition occurs while the workpiece undergoes rotation about the central stage axis.

12. The assembly of claim 11 further including a first rotary motor to pivot said first direct metal deposition nozzle around the first pivot axis.

13. The assembly of claim 12 further including a second rotary motor to pivot said second direct metal deposition nozzle around the second pivot axis.

14. The assembly of claim 11 wherein said first and second direct metal deposition nozzles are operable to move radially inward in unison with each other.

15. The assembly of claim 14 wherein said first and second direct metal deposition nozzles move radially outward in unison with each other.

16. The assembly of claim 11 further including third and fourth direct metal deposition nozzles supported above said rotary stage and operable in unison with said first and second direct metal deposition nozzles.

* * * * *